United States Patent [19]

Iwamura et al.

[11] Patent Number: 5,305,113
[45] Date of Patent: Apr. 19, 1994

[54] MOTION PICTURE DECODING SYSTEM WHICH AFFORDS SMOOTH REPRODUCTION OF RECORDED MOTION PICTURE CODED DATA IN FORWARD AND REVERSE DIRECTIONS AT HIGH SPEED

[75] Inventors: Ryuichi Iwamura, Tokyo; Yoshiyuki Akiyama, Kanagawa, both of Japan

[73] Assignee: Sony Corporation, Tokyo, Japan

[21] Appl. No.: 981,178

[22] Filed: Nov. 24, 1992

[30] Foreign Application Priority Data

Nov. 30, 1991 [JP] Japan .................. 3-342412

[51] Int. Cl.5 .............................. H04N 9/79
[52] U.S. Cl. .................... 358/312; 358/335; 360/10.1
[58] Field of Search .......... 358/335, 312, 313, 133, 358/135, 310, 136; 360/10.1, 10.3, 11.1, 8

[56] References Cited
U.S. PATENT DOCUMENTS

4,930,024  5/1990  Kanda et al. ............... 360/10.1
5,126,852  6/1992  Nishino et al. ............. 358/335
5,136,391  8/1992  Minami ..................... 358/310
5,140,437  8/1992  Yonemitsu et al. .......... 358/342

Primary Examiner—Tommy P. Chin
Assistant Examiner—Robert Chevalier
Attorney, Agent, or Firm—Philip M. Shaw, Jr.

[57] ABSTRACT

In a motion picture decoding system, forward and reverse reproduction is carried out smoothly at a high speed without increasing an operation speed for decoding. When high speed reproduction from a record medium containing motion picture coded data is selected, a rate of data input is controlled so that a speed for reading from the record medium to a buffer is increased. Motion picture coded data is fetched from the buffer to a demultiplexer. The fetched data is separated into picture data of frames to be decoded and picture data of frames to be abandoned at a constant frame interval. Only the picture data of the frames to be decoded is sent to a further stage where the picture data is decoded at a speed equal to that for an ordinary reproduction. Thereby, high speed reproduction in forward and reverse directions can be executed without increasing the speed of the decoding operation.

7 Claims, 6 Drawing Sheets

MOTION PICTURE DECODING SYSTEM WHICH AFFORDS SMOOTH REPRODUCTION OF RECORDED MOTION PICTURE CODED DATA IN FORWARD AND REVERSE DIRECTIONS AT HIGH SPEED

BACKGROUND OF THE INVENTION

1. Field of the Invention

This invention relates to a motion picture decoding system, in which is capable of reproducing and decoding motion picture coded data which is recorded in a record medium such as a compact disc and a hard disc.

2. Description of the Prior Art

Conventionally, since the motion picture data has a remarkably large amount of information, a record medium of which continuous transmission speed is extremely high is required for recording and reproducing the data. For example, video signals of an NTSC television system are currently recorded and reproduced in and from a so-called magnetic tape or an optical disc.

In addition to the foregoing, such means is essential that can encode video signals at a high efficiency for recording and can decode the reproduced signals at a high efficiency, in order to record the video signals in a record medium having smaller sizes and smaller information recording capacity for a long time. In order to comply with such demand, there has been proposed high efficiency coding systems utilizing correlation of the video signals, including an MPEG (Moving Picture Experts Group) system.

In the MPEG system, the difference between the picture frames of the video signals are taken to reduce the redundancy in a time axis direction, and thereafter, orthogonal transforming means such as DCT (discrete cosine transform) is used to reduce the redundancy in a spatial axis direction. In this manner, the video signals are efficiently coded for recording the same in a predetermined record medium.

For reproduction from the record medium in which the video signals coded at a high efficiency are recorded, it is designed to reproduce the video signals by efficiently decoding the signals, e.g., through inverse orthogonal transform.

In general, for the high-speed reproduction from the record medium, in which the efficiently coded video signals are recorded, as described above, decoding is carried out at intervals of few frames, and the decoded signals are supplied at the same speed as the ordinary reproduction for achieving the high-speed reproduction.

However, for the coding by the foregoing MPEG system, the coding is carried out by predicting the motion between the frames, and there exists a frame which cannot be decoded if the decoded image of a frame in the past or future with respect to the current frame does not exist. Therefore, such an disadvantage is caused that the frames may not be freely selected for the high-speed reproduction.

In practice, the frames allowing the direct access and the decoding are intraframe coded frames (will be referred to as "intraframe" hereinafter), each of which is generally contained in ten-odd frames, and thus the reproduction of only the intraframe cannot achieve smooth high-speed reproduction.

In order to overcome the above-noted disadvantages, the high-speed reproduction may be carried out by the decoding of all the frames at the processing speed several times larger than an ordinary speed. However, the processing speed of the decoding cannot be substantially increased several times due to restriction by hardware.

SUMMARY OF THE INVENTION

In view of the foregoing, an object of this invention is to provide a motion picture decoder, in which smooth reproduction in forward and reverse directions at a high speed is allowed without increasing the processing speed for the decoding.

The foregoing objects and other objects of the invention have been achieved by the provision of a motion picture decoding system for decoding a motion picture coded data including at least picture data and motion vector data between a series of pictures, which are recorded on a recording medium, and more particularly wherein the motion picture coded data includes intraframe (I-frame) data, in which image data only in a frame is compressed, predict frame (P-frame) data, which contains data of a prediction of motion in one time-axis direction from a frame which is either prior in time or a frame which is after in time from a current frame, and bidirectional frame (B-frame) data, which contains data of a prediction of motion in both time-axis directions from a frame which is prior in time and a frame which is after in time from a current frame, the decoding system comprising: a data input means for writing the motion picture coded data, which is reproduced from the recording medium, into a buffer memory at a variable rate, in a variable speed reproducing mode, a demultiplexing means for reading out the motion picture coded data from the buffer memory, dividing the read out data into I-frame picture data and P-frame picture data, and discarding B-frame picture data at predetermined intervals of frames and separating at least the picture data and the motion vector data for a first predetermined picture, an inverse orthogonal transforming means for inverse orthogonal transforming the picture data of the first predetermined picture which is obtained from said demultiplexing means and producing a decoded data, a motion predictive picture data generating means for generating a motion predictive picture data from at least said motion vector data of the first predetermined picture which is obtained from said demultiplexing means and from motion vector data of a second predetermined picture which is prior in time to the first predetermined picture in the series of pictures, and an original image picture generating means for producing original picture image data from the decoded data which is obtained from said inverse orthogonal transforming means and said motion predictive picture data which is obtained from said motion predictive picture data generating means.

According to the second aspect of the invention, the intended image frame selected by the demultiplexing means is formed of intra-frame coded frame, which is completed inside the frame, and a predictive coded frame for predicting the motion in one direction; and the inverse orthogonal transform executed by the inverse orthogonal transforming means is inverse discrete transform.

When the high-speed reproduction of the record medium containing the motion picture coded data is selected, the data input means controls a rate to increase the speed of reading from the record medium to a buffer, from which the motion picture coded data is fetched to the demultiplexing means. The demultiplexing means divides the same into picture data (I, P) of the frames to be decoded and picture data (B) of the frame to be abandoned at predetermined frame interval. Only the picture data (I, P) of the frames to be decoded is sent to a downstream stage, at which a decoding operation is carried out at the same speed as the ordinary reproduction. Thereby, the forward and reverse reproduction can be carried out at a high speed without increasing the processing speed of the decoding operation.

According to the invention, when the high-speed reproduction is selected, the data is read from the record medium at an increased speed, and is separated into the frames to be decoded and the frames to be abandoned at the constant frame intervals, and only the data of the frames to be decoded is sent to the downstream stage for the decoding processing at an speed equal to that for the ordinary reproduction, so that the motion picture decoder can achieve a smooth reproduction in the forward and reverse directions at a speed several times higher than that of the ordinary reproduction, without increasing the decoding processing speed.

The nature, principle and utility of the invention will become more apparent from the following detailed description when read in conjunction with the accompanying drawings in which like parts are designated by like reference numerals or characters.

DETAILED DESCRIPTION OF THE INVENTION

Figure 1:
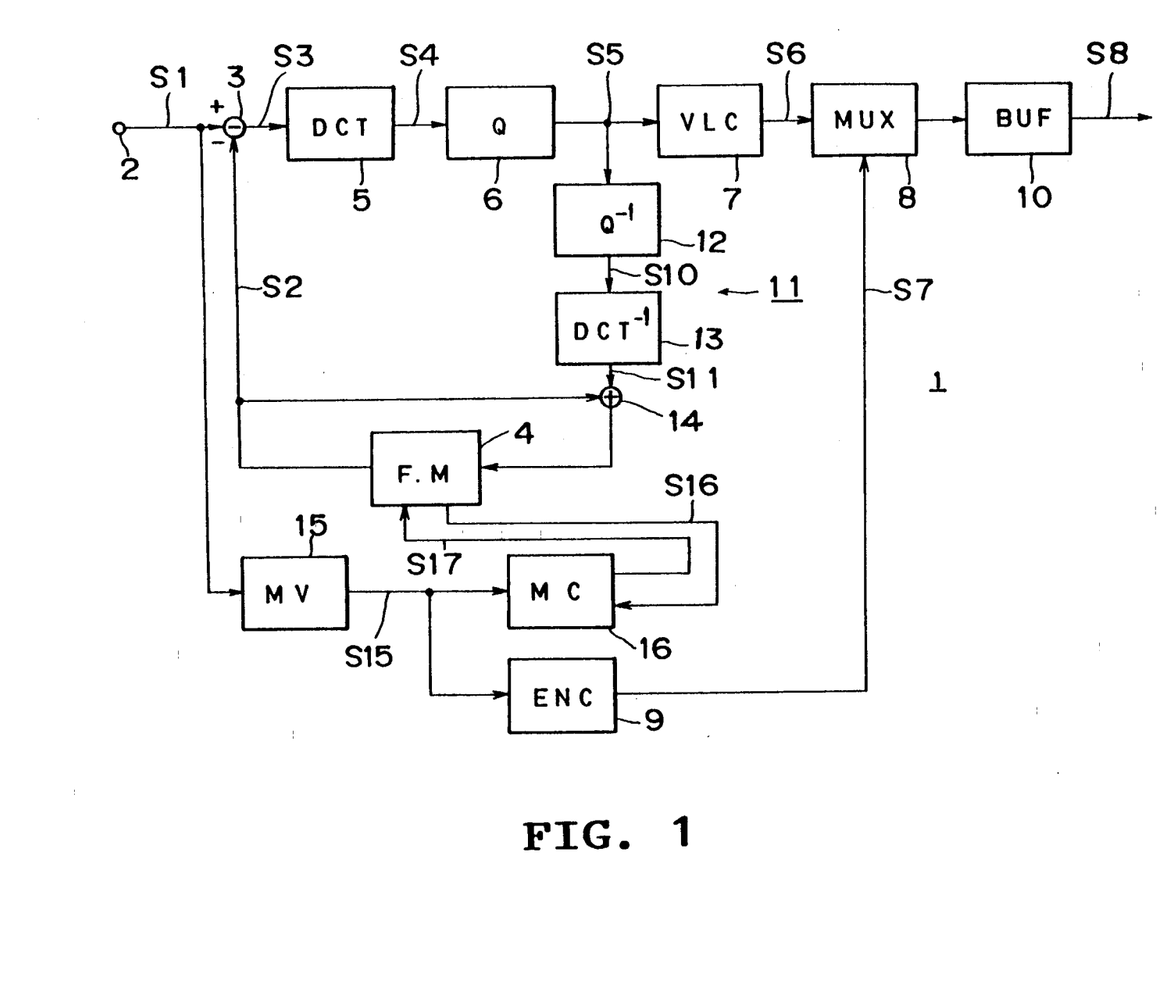
FIG. 1 is a block diagram showing a whole construction of motion picture data encoder.

Preferred embodiments of this invention will be described with reference to the accompanying drawings:

In FIG. 1, 1 generally indicates a motion picture data encoder, in which analog motion picture signals are converted into digital data and are supplied, as input picture data S1, through an input terminal 2 to a differential circuit 3.

The differential circuit 3 receives, in addition to the input picture data S1, previous frame picture data S2 as reference data from a frame memory 4, and thereby differential data S3 of the input picture data S1 and the previous frame picture data S2 is extracted and is supplied to discrete cosine transforming means, i.e., a discrete cosine transform circuit 5.

The discrete cosine transform circuit 5 serves to reduce redundancy in a spatial axis direction, utilizing two-dimensional correlation held by the picture, and carries out the discrete cosine transform of the supplied differential data S3 in units of minute blocks to obtain transformed data S4, which is sent to a quantizer 6. The DCT is represented as the orthogonal transforming means, and other transforming manners such as high-speed Fourier transform may be employed.

The quantizer 6 quantizes the transformed data S4 in accordance with a predetermined quantizing step size, and the quantized data S5 thus obtained is sent to a VLC (variable length coding) circuit 7, in which the quantized data S5 is subjected to the variable length coding to obtain the variable length coded data S6. The variable length coded data S6 is supplied to a multiplexer 8.

The multiplexer 8 receives, in addition to the variable length coded data S6, motion vector data S7 from an encoder 9, whereby the motion invector data S7 is multiplexed with the variable length coded data S6 to obtain transmission data S8, which is sent as an output of the motion picture data encoder 1 through a buffer 10 for the record in recorded on medium such as a compact disc.

In the motion picture data encoder 1, there is provided a local decoding system 11 for decoding the quantized data S5 to be sent as the transmission data S8 and supplying the same in the frame memory 4.

Practically, in the local decoding system 11, the quantized data S5 sent from the quantizer 6 is supplied to an inverse quantizer 12 for inverse quantization, and is sent therefrom as inversely quantized data S10 to an inverse discrete cosine transform circuit 13.

The inverse discrete cosine transform circuit 13 carries out inverse discrete cosine transform of the inversely quantized data S10 to obtain inverse discrete cosine transformed output S11, which is supplied to an adder circuit 14. The adder circuit 14 carries out the addition of the inverse discrete cosine transformed output S11 and the last frame picture data S2 read from the frame memory 4. The original input picture data S1 is locally decoded and is sequentially supplied to the frame memory 4 as a temporary record.

The previous frame picture data S2 read from the frame memory 4 is supplied not only on the adder circuit 14 but is also supplied to the differential circuit 3 described before, which carries out the arithmetic operation for obtaining the signals to be supplied to the discrete cosine transform circuit 5, and specifically for obtaining the differential picture information between the input picture data S1 supplied thereto and the previous frame picture data S2.

In the motion picture data encoder 1, the input picture data S1 supplied through the terminal 2 as the digital data is also supplied to the motion vector operation circuit 15. An arithmetic output, i.e., motion data S15, of the motion vector operation circuit 15 is sent to a motion compensation circuit 16 and is also supplied to encoding means, i.e., encoder 9.

The motion compensation circuit 16 receives a memory read output S16 from the frame memory 4, and supplies a motion compensation output S17 to the frame memory 4.

The encoder 9 encodes the motion data S15 which is obtained by the motion vector operation circuit 15, and sends it as the motion vector data S7 to the multiplexer 8.

Figure 2:
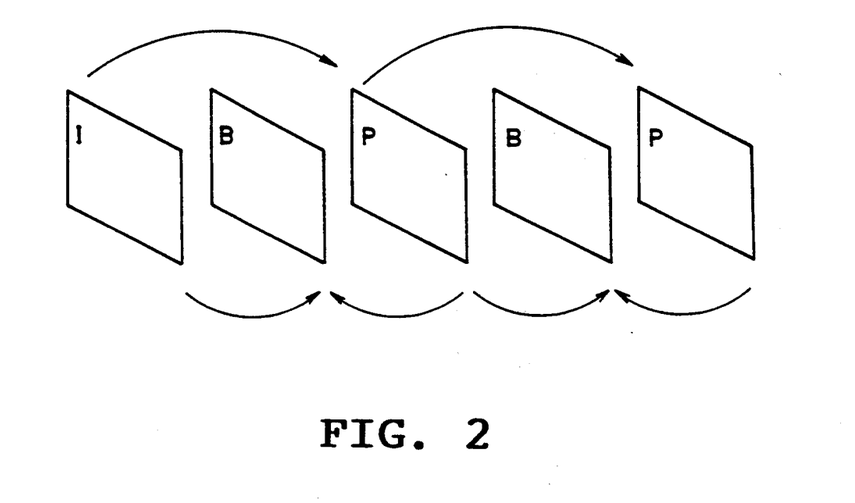
FIG. 2 is a schematic diagram for showing an inter-frame motion prediction system employed in a motion picture data encoder in FIG. 1.

A method for prediction between the frames by the motion picture data encoder 1 is shown in FIG. 2, in which a sequence for a series of transmission data S8 is formed of a so-called intra-frame, which carries out the data compression only in a given frame, a so-called predict frame, which carries out the prediction of motion in one time-axis direction from a past frame or a future frame, and a so-called bidirectional frame, which carries out the prediction of motion in both time-axis directions from a past frame and a future frame.

In FIG. 2, they are illustrated as I-frame, P-frame and B-frame. In practice, the I-frame does not carry out the inter-frame prediction and is completed in the frame. The P-frame carries out the motion prediction, utilizing the past I-frame or P-frame as the reference frame. The B-frame carries out the motion prediction, utilizing the I-frame and/or P-frame in the past and future.

The sequence is formed of a combination of these three kinds of frames. Generally, the I-frame are disposed at a constant cycle, e.g., of 10-20 frames, and the P-frame or B-frame is disposed between the I-frames. The sequence is represented, for example, by the following formula.

$$I0, B00, P00, B01, P01, B02, P02, B03, I1, B10, P10 \ldots \quad (1)$$

In this sequence, the P-frame must be already decoded in order to decode the B-frame, and the order of the actual coding and recording in the record medium such as compact disc is represented by the following formula $$I0, P00, B00, P01, B01, P02, B02, I1, B03, P10, B10 \ldots \quad (2)$$

Figure 3:
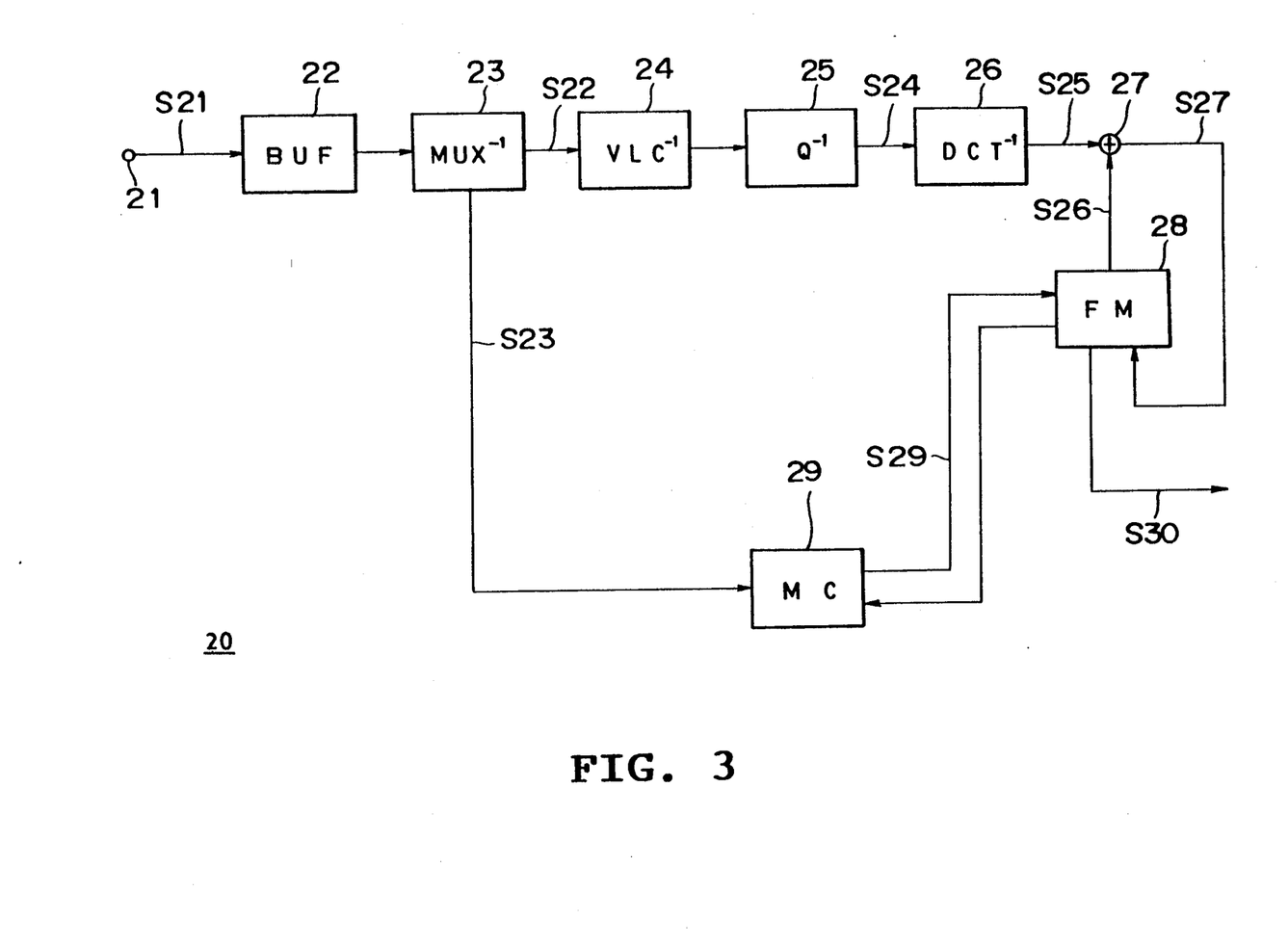
FIG. 3 is a block diagram showing a whole structure of a motion picture data decoder according to an embodiment of the invention.

In FIG. 3, 20 generally designates a motion picture data decoder according to the invention, in which reproduction data S21 read from the record medium is supplied from an input terminal 21 through a buffer 22 to demultiplexing means, i.e., demultiplexer 23.

The demultiplexer 23 separates reproduction picture data S22 and vector data S23 from the reproduction data S21. The reproduction picture data S22 is decoded by a variable length code decoding circuit 24 and is decoded by an inverse quantizer 25 into picture data which is the same as that before quantization.

The decoded picture data S24 is subjected to the inverse discrete cosine transform processing by inverse discrete cosine transforming means, i.e., inverse discrete cosine transform circuit 26, and decoded into picture data S25 thus obtained is added to an adder circuit 27.

In this adder circuit 27, reference data S26 read from the frame memory 28 is added to the decoded picture data S25, whereby original picture data S27 is obtained by decoding, and is stored in a frame memory 28.

On the other hand, the motion vector data S23 separated by the multiplexer 23 is supplied to a motion compensation circuit 29 connected to the frame memory 28, and is utilized to produce the predictive picture data S29, which is added through the frame memory 28 to the adder circuit 27.

In practice, the adder circuit 27 is constructed to supply the output S27 thereof to the frame memory 28. The predictive picture data S29 sent from the motion compensation circuit 29 is added to the decoded picture data S27 to form the original image data S30, which is sent as the output of the motion picture data decoder 20.

In the high-speed forward reproduction by the motion picture data decoder 20 of the illustrated embodiment, a technique, which will be described later, is used to increase the speed of reading of the reproduction data S21 in the buffer 22. Further, the demultiplexer 23 abandons the picture data S22 of the B-frame, and only the picture data S22 of the I-frame is supplied to the subsequent variable length code decoding circuit 24, inverse quantizer 25 and inverse discrete cosine transform circuit 26.

In practice in the case of the sequence described before with reference to the formula (1), the data is supplied to the demultiplexer 23 in accordance with the sequence which has been described with reference to the formula (2), and the output thereof, i.e., picture data S22 has the sequence represented by the following formula.

$$I0, P00, P01, P02, I1, P10 \ldots \quad (3)$$

The decoding processing is carried out similarly to the equal-speed reproduction. For example, in the NTSC system, the decoded picture data S30 is supplied at the rate of 30 frames per second, since B-frame is not existence, and consequently, every second frame is reproduced, so that the reproduction speed is doubled.

On the other hand, for the high-speed reverse reproduction by the motion picture data decoder 20, which will be described later, is utilized to increase the second of reading of the reproduction data S21 in the buffer 22, and the order for the reading from the frame memory 28 is changed.

More specifically, it is assumed that the reproduction data S21 supplied from the record medium is carried out, for example, in the order corresponding to the sequence which has been described with reference to the formula (2), and that the $I_1$-frame is now being reproduced. In this case, upon selection of the high-speed reverse reproduction, the $I_0$-frame, which precedes the $I_1$-frame, is initially read, and the recording in the frame memory 28 is sequentially carried out in the order of $I_0$-frame, $P_{00}$-frame, $P_{01}$-frame and $P_{02}$-frame, while decoding only the P-frames, which is similar to the high-speed forward reproduction.

Then, the reading from the frame memory 28 is carried out in the order of $P_{02}$-frame, $P_{01}$-frame and $I_0$-frame, whereby the picture data S30 is formed. This operation is repeated, whereby the high-speed reverse reproduction is enabled.

Figure 4:
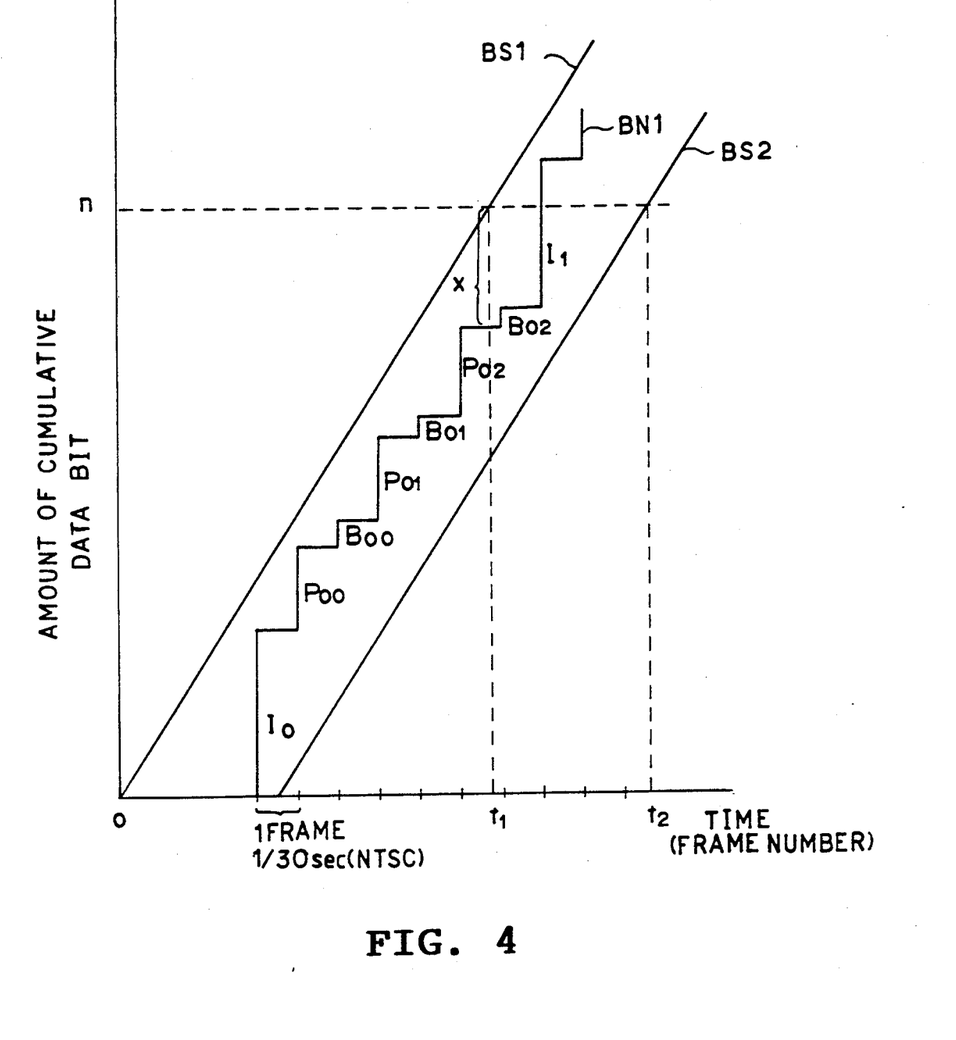
FIG. 4 is a characteristic curve diagram for showing a quantity of data supplied to and from a buffer 22 for an ordinary reproduction in a motion picture data decoder in FIG. 3.

In connection with the foregoing construction, a description will now be made on the speed of reading of the reproduction data S21 from the record medium during the high speed reproduction. In the ordinary reproduction, the data occupies the buffer 22, as shown in FIG. 4. In FIG. 4, the abscissa represents the time or the frame number of the decoded picture data supplied from the motion picture data decoder 20, and the ordinate represents the accumulated data bit quantity of the reproduction data supplied to the buffer 22 from the record medium.

It is now assumed that the reproduction data S21 is supplied into and from the buffer 22 at a constant rate. In this case, the reproduction data S21 at the nth bit in FIG. 4 exists in the buffer 22 only for a time period defined between bit supply lines BS1 and BS2, i.e., between times t1 and t2. Therefore, the motion picture data decoder 20 must read the reproduction data S21 from the buffer 22 in this time period. In FIG. 4, "x" represents the buffer occupation quantity of the reproduction data S21 at time t1.

Bit demand line BN1, which represents the data bit quatity demanded by the motion picture data decoder 20, forms a bent line as shown in the figure, because the data quantities are different from each other, depending on the I, P and B frames. The bit demand line BN1 must be always located between the two bit supply lines BS1 and BS2. If the bit demand line BN1 exceeds the bit supply line BS1, the buffer 22 becomes empty and end underflow is caused. Conversely, if it exceeds and bit supply lines BS2, the overflow is caused.

Figure 5:
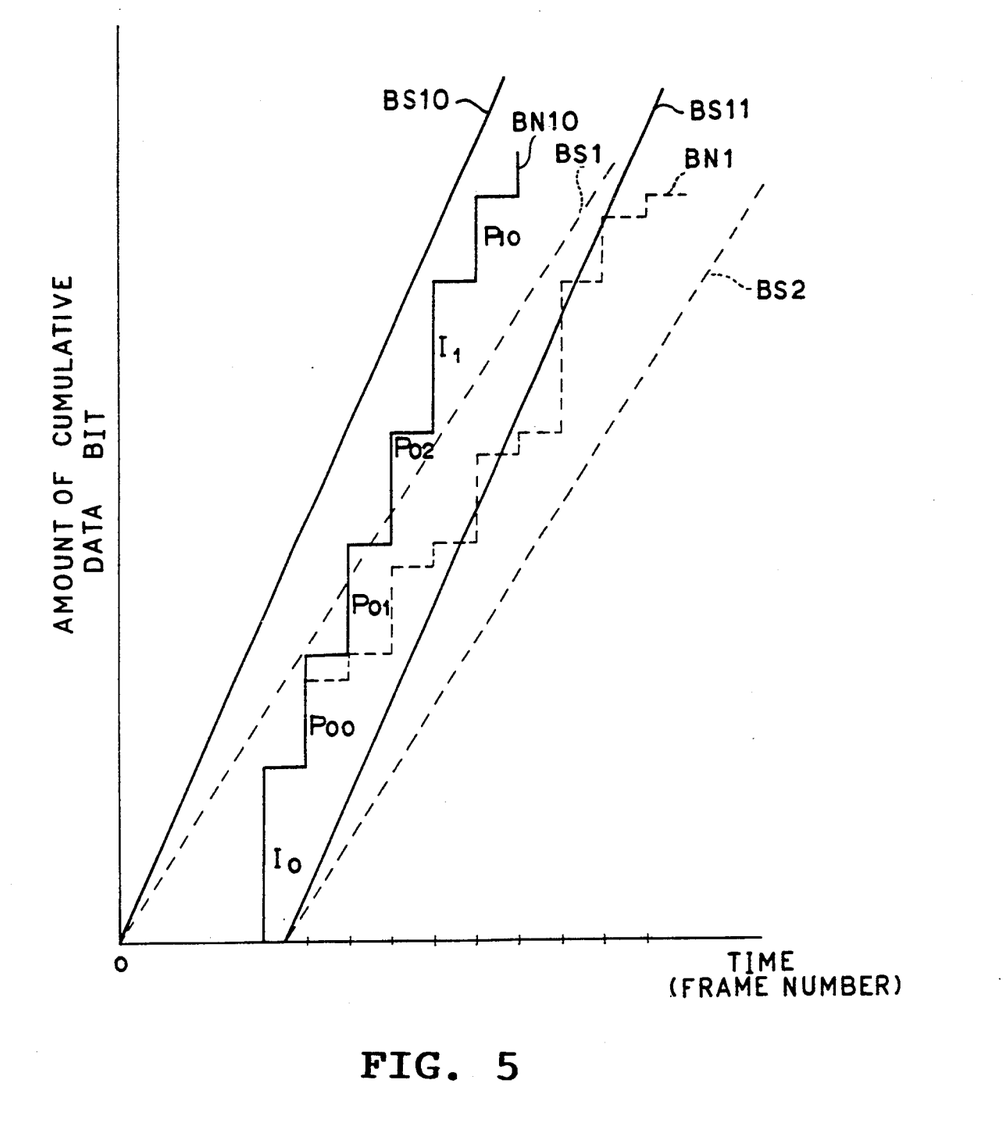
FIG. 5 is a characteristic curve diagram for showing a data quantity supplied to and from a buffer 22 for a high-speed reproduction in a motion picture data decoder in FIG. 3.

FIG. 5 shows the data occupation quantity in the buffer 22 in the double speed reproduction. In this figure, the dashed line represents the bit supply lines BS1 and BS2 and the bit demand line BN1 in the ordinary reproduction. Since the reproduction data S21 of the B-frame is abandoned in the high-speed reproduction, the inclination of the bit demand line BN10 increases. Therefore, the buffer 22 attains the underflow state, if the bit supply line BS1 remains as it is.

Therefore, the data quantity supplied to the buffer 22 is increased to increase the inclination of bit supply lines BS10 and BS11 as shown in FIG. 5, whereby the high-speed reproduction is allowed without failure of the buffer 22.

As described before, the high-speed reproduction requires an increase of the data quantity supplied into the buffer 22, which can be achieved by the following two manners. In one of the, the speed of reading from the record medium is simply increased in the high-speed reproduction, and the compact disc can be used as the record medium if the rotation speed of the disc is increased.

The other manner is taught in the Japanese Patent Application No. 3-198591, in which the speed for reading the data from the record medium to the buffer 22 is always set high. Since this setting may cause an overflow of the buffer 22, the upper and lower limits are set in the data occupation quantity in the buffer 22. If the data quantity in the buffer 22 exceeds this upper limit, the reading from the record medium is stopped and maintained in a standby state. The reading is restarted if the data quantity exceeds the lower limit. The operation in this manner is repeated, whereby the decoding processing of the image can be carried out without failure of the buffer 22.

Figure 6:
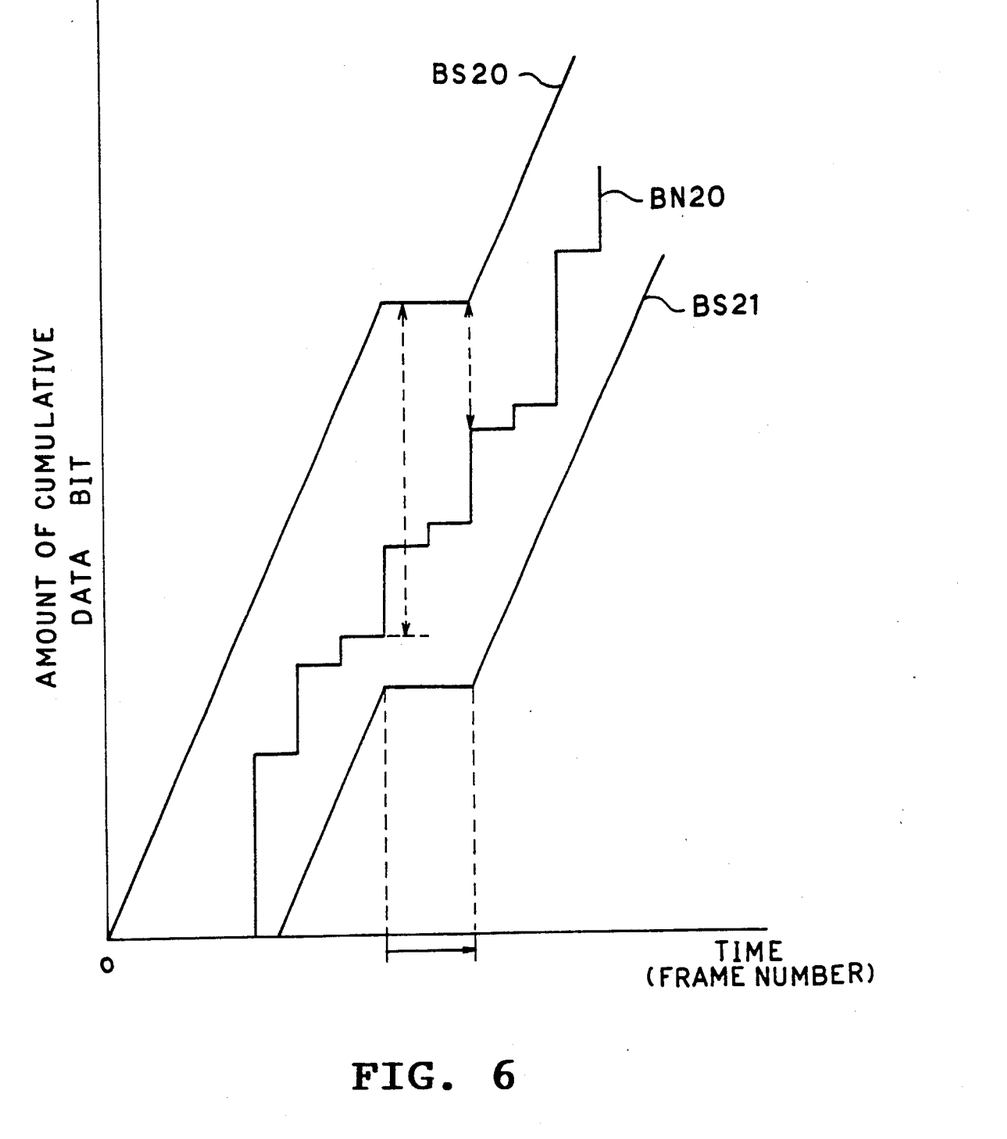
FIG. 6 is a characteristic curve diagram for showing another embodiment, and particularly, a quantity of data supplied to and from a buffer 22 in a motion picture data decoder in FIG. 3.

The condition of the above operation is shown in FIG. 6. In practice, the bit supply lines BS20 and BS21 are parallel to the time axis during stepping of the data reading, and the bit demand line BN20 does not exceed the bit supply lines BS20 and BS21. This technique is applied not only to the ordinary reproduction but also to the high-speed reproduction, whereby just enough of the reproduction data S21 the buffer 22 to the buffer 22 can be supplied the buffer 22 in the high-speed reproduction.

According to the above construction, when the high-speed reproduction is selected, the speed for reading the data from the record medium to the buffer is increased, and only the I-frame and P-frame are sent to the downward stage as the frames to be decoded for the decoding processing at the same speed as the ordinary reproduction, while abandoning the B-frames. Thereby, the motion picture data decoder 20 can execute the smooth reproduction of the motion picture data in the forward and reverse direction at the high speed several times as large as the ordinary speed, without increasing the decoding speed.

The embodiment described above utilizes the sequence of I-frame, B-frame, P-frame, B-frame, P-frame, B-frame, P-frame, I-frame, . . . However, the combination of the I, P and B frames is not restricted to the foregoing, and various frame sequences may be employed for achieving the same or similar effect as the illustrated embodiment.

The embodiment described above sets the unit at a frame, similarly, it may set the unit at a field.

Figure 7:
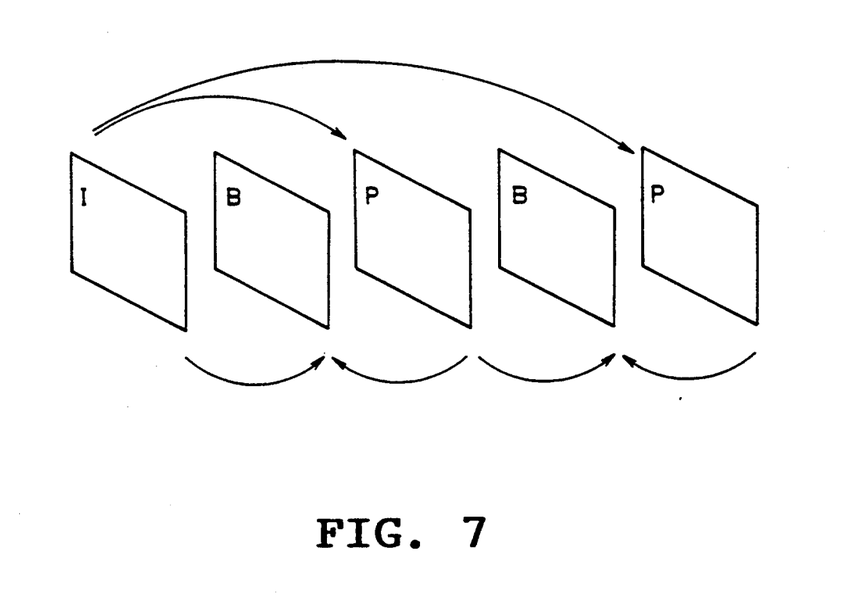
FIG. 7 is a schematic diagram for showing another example of an inter-frame motion prediction system employed in a motion picture data encoder in FIG. 1.

Further, in the description of the embodiment, the inter-frame prediction system has been described with reference to the MPEG system. However, a prediction system, other than the MPEG system, may be employed. For example, the P-frame may always utilize the I-frame as the reference frame, as shown in FIG. 7, in which case not only the B-frame but also any P-frame may be abandoned, and thus the speed for the high-speed reproduction can be selected more freely.

Although the above described embodiment relates to the motion picture decoder utilizing the discrete cosine transform and the inter-frame prediction, the invention may be applied to any system which carries out similar inter-frame prediction, and is not restricted to the orthogonal transform system.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A motion picture decoding system for decoding a motion picture coded data including at least picture data and motion vector data between a series of pictures, which are recorded on a recording medium, and more particularly wherein the motion picture coded data includes intra-frame data, in which image data only in a frame is compressed, predict frame data, which contains data of a prediction of motion in one direction from a frame which is either prior in time or a frame which is after in time from a current frame, and bidirectional frame data, which contains data of a prediction of motion in both directions from a frame which is prior in time and a frame which is after in time from a current frame, the decoding system comprising:

a data input means for writing the motion picture coded data, which is reproduced from the recording medium, into a buffer memory at a variable rate, in a variable speed reproducing mode;

a demultiplexing means for reading out the motion picture coded data from the buffer memory, dividing the read out data into I-frame picture data and P-frame picture data, and discarding B-frame picture data at predetermined intervals of frames and separating at least the picture data and the motion vector data for a first predetermined picture;

an inverse orthogonal transforming means for inverse orthogonal transforming the picture data of the first predetermined picture which is obtained from said demultiplexing means and producing a decoded data;

a motion predictive picture data generating means for generating a motion predictive picture data from at least said motion vector data of the first predetermined picture which is obtained from said demultiplexing means and from motion vector data of a second predetermined picture which is prior in time to the first predetermined picture in the series of pictures; and an original picture image data generating means for obtaining an original image picture from the decoded data which is obtained from said inverse orthogonal transforming means and said motion predictive picture data which is obtained from said motion predictive picture data generating means.

2. A motion picture decoding method for decoding motion picture coding data including at least picture data and motion vector data between a series of pictures, which are recorded in a recording medium, and more particularly wherein the motion picture coded data includes intra-frame (I-frame) data, in which image data only in a frame is compressed, predict frame (P-frame) data, which contains data of a prediction of motion in one direction from a frame which is either prior in time or a frame which is after in time from a current frame, and bidirectional frame (B-frame) data, which contains data of a prediction of motion in both directions from a frame which is prior in time and a frame which is after in time from a current frame, the decoding method comprising the steps of:

a data input step for reproducing the motion picture coded data recorded in recording medium and writing the reproduced motion picture coded data into a buffer memory, at variable rate, in a variable speed reproducing mode;

a demultiplexing step for reading out the motion picture coded data from the buffer memory, dividing the read out data into I-frame picture data and P-frame picture data, and discarding B-frame picture data at predetermined intervals of frames and separating at least the picture and the motion vector data for a first predetermined picture;

a inverse orthogonal transforming step for inverse orthogonal transforming the picture data of the first predetermined picture which is obtained in said demultiplexing step and producing a decoded data;

a motion predictive picture data generating step for generating the motion predictive picture data from said motion vector data of the first predetermined picture which is obtained in said demultiplexing step and from motion vector data of a second predetermined picture which is prior in time to the first predetermined picture in the series of pictures; and an original picture image data generating step for obtaining an original image picture from the decoded data which is obtained in said inverse orthogonal transforming step and said motion predictive picture data which is obtained in said motion predictive picture data generating step.

3. The motion picture decoding system according to claim 1, wherein:

said variable speed reproducing mode is a high speed reproducing mode in which the speed for reproducing the data from the recording medium and writing the reproduced data to the buffer memory is increased.

4. The motion picture decoding system according to claim 1, wherein:

said inverse orthogonal transforming means performs an inverse discrete cosine transform.

5. The motion picture decoding method according to claim 2, wherein:

said variable speed reproducing mode is a high speed reproducing mode in which the speed for reproducing the data from the recording medium and writing the reproduced data to the buffer memory is increased.

6. The motion picture decoding method according to claim 2, wherein:

said inverse orthogonal transforming step is an inverse discrete cosine transform.

7. The motion picture decoding system according to claim 1, wherein the original picture image data generating means further comprises:

a frame buffer memory means supplied with the decoded picture data and the motion predictive picture data for adding the motion predictive picture data to the decoded picture data to form original image picture data of the first predetermined picture and to supply the original picture image data of the second predetermined picture to the motion predictive picture data generating means which extracts the motion vector data from the original picture image data of the second predetermined picture.

* * * * *